US009730373B2

(12) United States Patent
Smola

(10) Patent No.: US 9,730,373 B2
(45) Date of Patent: Aug. 15, 2017

(54) DEVICE FOR FOLDING THE WORKING TOOLS OF AGRICULTURAL MACHINERY

(71) Applicant: FARMET a.s., Ceska Skalice (CZ)

(72) Inventor: Tomas Smola, Chvalkovice (CZ)

(73) Assignee: FARMET A.S., Česká Skalice (CZ)

( * ) Notice: Subject to any disclaimer, the term of this patent is extended or adjusted under 35 U.S.C. 154(b) by 0 days.

(21) Appl. No.: 14/888,566

(22) PCT Filed: Apr. 30, 2014

(86) PCT No.: PCT/CZ2014/000047
§ 371 (c)(1),
(2) Date: Nov. 2, 2015

(87) PCT Pub. No.: WO2014/177121
PCT Pub. Date: Nov. 6, 2014

(65) Prior Publication Data
US 2016/0106019 A1 Apr. 21, 2016

(30) Foreign Application Priority Data
May 2, 2013 (CZ) .................................... 2013-327

(51) Int. Cl.
A01B 61/04 (2006.01)
A01B 15/02 (2006.01)
(52) U.S. Cl.
CPC ............ A01B 61/044 (2013.01); A01B 15/02 (2013.01); A01B 61/046 (2013.01)
(58) Field of Classification Search
CPC .................................................. A01B 61/046
(Continued)

(56) References Cited

U.S. PATENT DOCUMENTS 397,962 A * 2/1889 Bird ..................... A01B 61/046
172/265
642,510 A * 1/1900 Tuttle et al. ........... A01B 35/22
172/268
(Continued)

FOREIGN PATENT DOCUMENTS

AU 7944991 A 1/1992
DE 39070 B 5/1965
(Continued)

OTHER PUBLICATIONS

International Search Report and Written Opinion for corresponding Patent Application No. PCT/CZ2014/000047 dated Sep. 12, 2014.
(Continued)

Primary Examiner — Thomas B Will
Assistant Examiner — Joel F. Mitchell
(74) Attorney, Agent, or Firm — Renner, Otto, Boisselle & Sklar, LLP

(57) ABSTRACT

A device for folding the working tool of an agricultural machine, specifically a device for folding the working tool (1) of an agricultural machine and protecting the working tool from over-strain. The device is mounted on a frame (7) of the agricultural machine. The working tool (1) is swivel-mounted with its back against an overloading force, which creates at least one swivel mounted protection from an over-strain protection device (2). On the working tool (1) the upper pivoting part (5) and the lower pivoting part (6) are mounted. On the frame (7) are mounted the upper pivoting part (8) and the lower pivoting part (9). The upper pivoting part (5) of the working tool (1) is connected to the lower pivoting part (9) of the frame (7) by a drawbar (3). The lower pivoting part (6) of the working tool (1) is connected to the upper pivoting part (8) of the frame (7) by a second drawbar (4).

5 Claims, 2 Drawing Sheets

Figure 1:
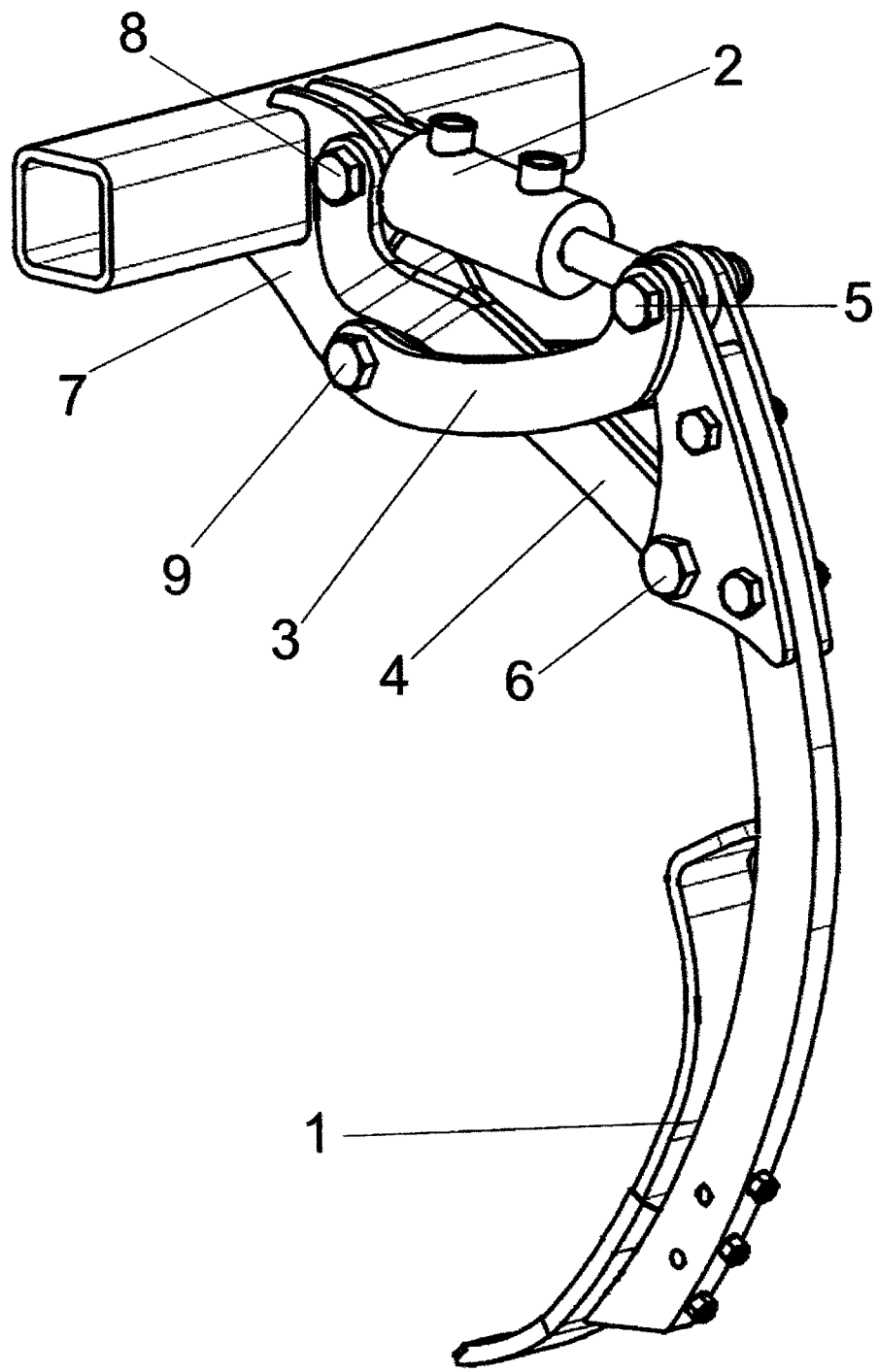

(58) Field of Classification Search
USPC .................................................. 172/260.5
See application file for complete search history.

(56) References Cited

U.S. PATENT DOCUMENTS

| | | | | |
|---|---|---|---|---|
| 3,321,027 | A * | 5/1967 | Johnson et al. | A01B 61/046 172/260.5 |
| 3,536,141 | A * | 10/1970 | Woelfel | A01B 61/046 172/234 |
| 4,143,718 | A | 3/1979 | Quanbeck | |
| 4,249,614 | A * | 2/1981 | van der Lely | A01B 61/046 172/260.5 |
| 4,505,337 | A | 3/1985 | Ryan | |
| 5,921,010 | A * | 7/1999 | Schulte et al. | E01H 5/063 172/260.5 |
| 5,988,291 | A * | 11/1999 | Yeomans | A01B 61/046 172/261 |
| 6,955,131 | B2 * | 10/2005 | Beaujot et al. | A01B 63/26 111/170 |
| 7,823,651 | B2 * | 11/2010 | Olson | A01B 61/046 172/260.5 |
| 2011/0290165 | A1 | 12/2011 | Lung | |
| 2012/0168186 | A1 | 7/2012 | Kile | |
| 2014/0209335 | A1 * | 7/2014 | Casper et al. | A01B 5/04 172/260.5 |

FOREIGN PATENT DOCUMENTS

| | | |
|---|---|---|
| DE | 10 2010 023329 A1 | 12/2011 |
| FR | 2548516 A | 1/1985 |
| FR | 2 641 664 A1 | 7/1990 |
| WO | 9701949 A | 1/1997 |

OTHER PUBLICATIONS

Search Report for corresponding CZ Patent Application No. PV 2013-327 dated Jul. 10, 2013.

\* cited by examiner

DEVICE FOR FOLDING THE WORKING TOOLS OF AGRICULTURAL MACHINERY

This application is a national phase of International Application No. PCT/CZ2014/000047 filed Apr. 30, 2014 and published in the English language.

TECHNICAL FIELD

The invention relates to a device for folding working tools of an agricultural machine, specifically a device for folding working tools of an agricultural machine and protecting the working tools from over-strain.

STATE OF THE ART

Currently, there are many structural arrangements known which address the issue of storing working tools on the frame of an agricultural machine.

From patent document FR 2832203, for example, a locking device is known in which a working tool is mounted on the frame of the agricultural machine by means of adjacent parallel arms and a hydraulic piston. Both the arms and the hydraulic piston are rotatably mounted to the working tool and the frame. The disadvantage of this locking device is that it cannot be effectively used for folding the working machine into a transport position to reduce its transport dimensions.

Further, from patent document DE 19810682 a working tool of an agricultural machine is known which protects from over-strain, where the working tool is a spade ploughshare. The agricultural machine has a certain number of spade ploughshares. The ploughshares are always composed of one upright part and one pointed spade which are attached to the frame and can pivot backwards to deflect an overloading force. The overloading force is generated by means of an overload instrument mounted between the frame and the spade ploughshares. The overload instrument is always connected by an articulated joint to both the frame and the spade ploughshares. The upright part is concurrently situated directly on the rear portion of supporting frame plates. An upper end of the upright part is driven by combined upward thrust and, as it turns, rotates in the fixed part of the frame. The upright part is then lowered to a resting position via a lever. The lever is attached to one side of the upright part by a joint, and to the other side by a front portion thereof, above the jointed connection mount, to the supporting frame or as the case may be to the fixed part of the frame. As such, the overload instrument is stored behind the rear of the upright part. This design has a single purpose—to simply protect the working tool from over-strain. It cannot be used for folding the working tool into a transport position.

From U.S. Pat. No. 7,823,651 there is a mechanism of a soil working tool. The working tool is mounted to rotate in the machine frame. A hydraulic piston is also mounted so as to rotate relative the frame. Both the arm of the tool and the hydraulic piston are also rotatably mounted to the machine frame. This device has the same drawbacks as the other two devices.

From international patent application WO 97/01949 is shown an arrangement for storing the working tools of agricultural machines. At two points on the working tool, an arm and a hydraulic piston are mounted. The arm and the hydraulic piston are stored together in the machine frame in such a way that they are positioned parallel to each other.

From the above current state-of-the-art technology, it is apparent that the major disadvantage is that the existing devices for protection against over-strain of the working tool cannot be used for effective folding of the working tool into a transport position. Folding needs to be addressed in other ways, which for the most part results in increased costs and essentially limits options in regards to reducing the dimensions of the agricultural machinery in the transport position.

The aim of the invention is to design a device for folding the working tools of an agricultural machine which will also function as a protective device against over-strain while allowing the dimensions of the machine in the transport position to be minimised.

PRINCIPLE OF THE INVENTION

The invention largely eliminates these deficiencies and fulfils the objective by a folding device of an agricultural machine, specifically a device for folding the working tools of the agricultural machine and its protection against overstrain. The device is arranged on a frame of the agricultural machine. The working tool is swivel-mounted with its back against the overloading force, which creates at least one swivel-mounted protection from an over-strain device according to the invention. On the working tool, the upper and lower parts are arranged so as to pivot. On the frame, the upper and lower parts are arranged so as to pivot. The upper pivoting part of the working tool is connected by a drawbar to the lower pivoting part of the frame. The lower pivoting part of the working tool is connected by a second drawbar to the upper pivoting part of the frame. The cross-linkage arrangement of the drawbars is advantageous in terms of the strength ratio of the whole mechanism, and also significantly allows—by up to half—a reduction of the dimensions of the folded working tool of the agricultural machine in the transport position. The four-joint mechanism of the crossbars not only allows folding of the working tools into the transport position, but is also advantageous in terms of protecting the working tool from obstacles while working.

An advantage is that the drawbars are dimensionally shaped so as to allow the optimisation of the spatial arrangement of the four-joint mechanism and the optimization of the strength of the over-strain protection device.

An advantage is that the over-strain protection device is simultaneously mounted on both the working tool and on the frame. In advantageous variants, the strain-protecting device is simultaneously mounted in the upper pivoting part of the working tool and in the upper pivoting part of the frame or, alternatively, in the lower pivoting part of the working tool and in the lower pivoting part of the frame. This over-strain protection device is optimal in terms of minimising size.

In regards to the set-up of the whole mechanism, an advantage is that the over-strain protection device, with regard to the possibility of changes in the settings of the entire mechanism, is adjustable in force and/or in length.

In the most advantageous embodiment, the over-strain protection device is a hydraulic cylinder. Hydraulic cylinder over-strain protection device allows for changes in pressure to continuously regulate the release switch force. In this way, the course of the release switch force has favourable characteristics. Hydraulic protection in combination with the four-joint mechanism with crossbars can also achieve great release forces to be achieved.

Optionally, an advantage is that the over-strain protection device is a pneumatic cylinder or a spring.

The biggest advantage of the folding device and the over-strain protection device of the working tool of the agricultural machine according to the invention is that its use can reduce the transport frame size by half. Thus, it is possible to build wider machines or to set the current working machine tools at a greater working depth. Due to positive force conditions of the device, it is also advantageous that the working tool in the work mode is kept firmly in the ground, as there is no change to the angle of work. An impact to the working tool by an obstacle such as a stone will increase the pressure to the over-strain protection device, which is most advantageously a hydraulic piston rod, and if this exceeds the allowable working pressure, hydraulic oil will be let into the accumulator and the working tool will be quickly released. After overcoming obstacles, the working tool returns to its original working position.

Using a four-joint mechanism with crossbars allows, with a short piston stroke, the working tool to be folded a great distance. Further, release is very rapid due to a short stroke of the piston rod, which allows a quick vertical move when it hits an obstacle.

The great advantage of this equipment, according to the invention, is also that the working tool is both protected and folded by one and the same construction unit.

OVERVIEW OF THE FIGURES

Figure 2:
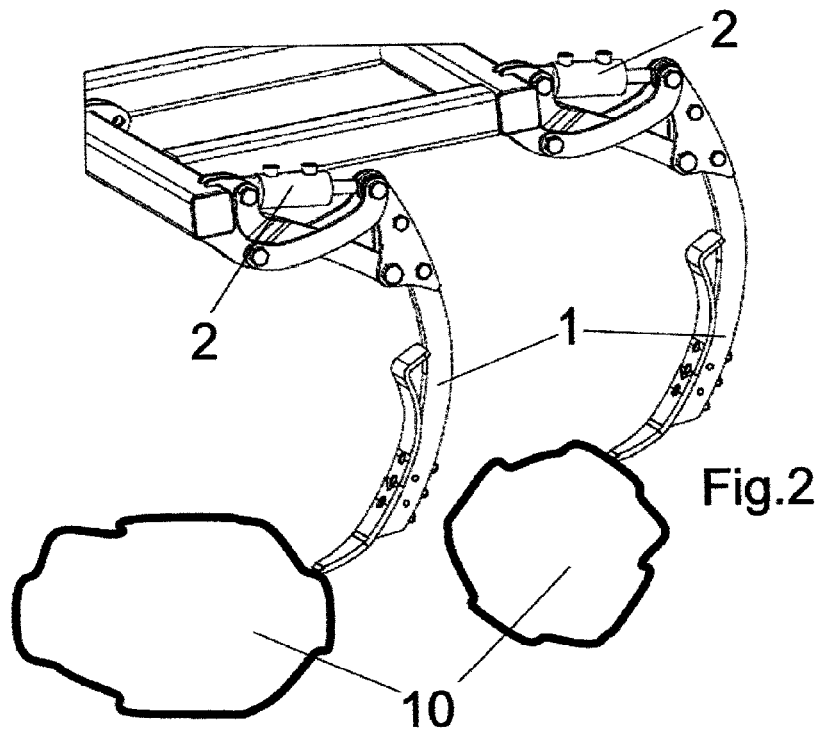
Figure 3:
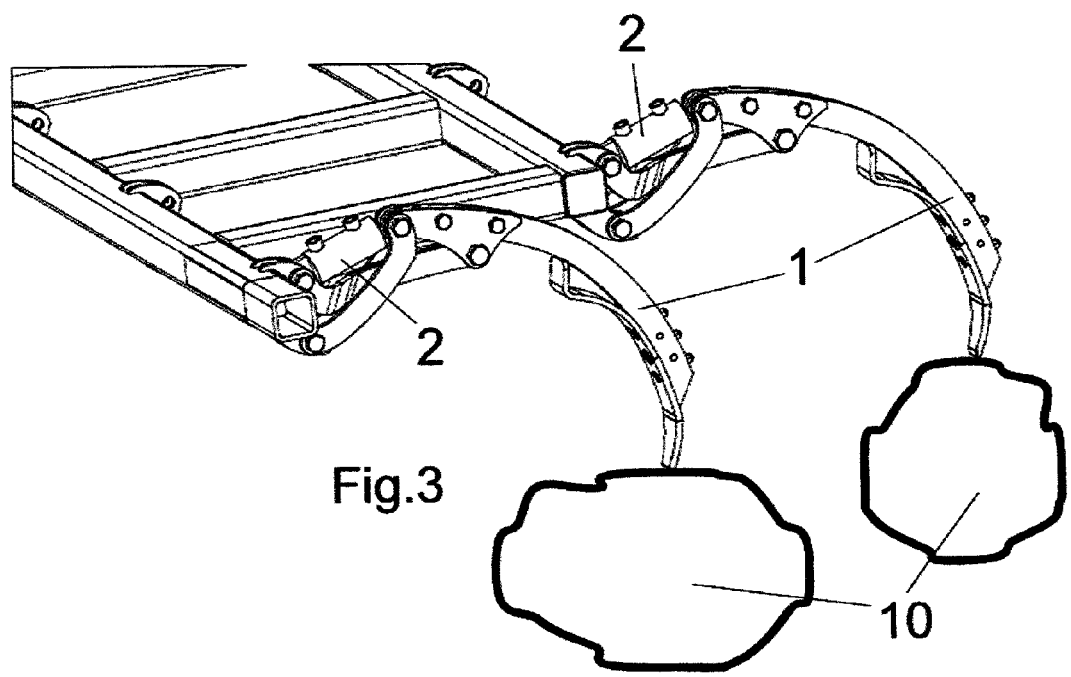

The invention will be further illustrated by drawings in which:

FIG. 1 shows a side view of an embodiment of a device for folding the working tools of an agricultural machine and protecting the working tools from over-strain, where the strain-protecting device is simultaneously mounted in the upper pivoting part of the working tool and in the upper pivoting part of the frame, FIG. 2 shows a side view of a pair of devices for folding the working tools of the agricultural machine and its protection against over-strain at the moment of approaching an obstacle, and FIG. 3 shows a side view of a pair of devices for folding the working tools of the agricultural machine and its protection against over-strain at the moment when the obstacle is being overcome.

EXAMPLES OF THE PERFORMANCE OF THE INVENTION

A device for folding the working tools and protecting the working tools 1 from over-strain of an agricultural machine (FIG. 1) is mounted on the frame 7 of the agricultural machine. The working tool 1 is swivel-mounted with its back against the overloading force, which creates one swivel mounted protection from over-strain device 2.

On the working tool 1 the upper pivoting part 5 and the lower pivoting part 6 are mounted, and on the frame 7 are mounted the upper pivoting part 8 and the lower pivoting part 9. The upper pivoting part 5 of the working tool 1 is connected to the lower pivoting part 9 of the frame 7 by a drawbar 3, and the lower pivoting part 6 of the working tool 1 is connected to the upper pivoting part 8 of the frame 7 by a second drawbar 4. Both drawbars 3,4 are shown as dimensionally shaped.

A strain-protecting device 2 is simultaneously mounted in the working tool 1 and in the frame 7.

According to the first variant (FIG. 1) the strain-protecting device 2 is simultaneously mounted in the upper pivoting part 5 of the working tool 1 and in the upper pivoting part 8 of the frame 7.

According to the second variant, not shown, the strain-protecting device 2 is simultaneously mounted in the lower pivoting part 6 of the working tool 1 and in the lower pivoting part 9 of the frame 7.

The over-strain protection device 2 is adjustable in force and in length. The over-strain protection device 2 is a hydraulic cylinder. Optionally, the over-strain protection device 2 can be a pneumatic cylinder or a spring.

The device for folding and protecting the working tools of an agricultural machine operates such that at the moment (FIG. 2) when the working tool 1 hits a fixed obstacle 10 such as a stone, the pressure to the over-strain protection device 2 will increase. If the pressure to the over-strain protection device 2 exceeds the allowable working pressure, then hydraulic oil will be let into the accumulator and the working tool will be quickly released, in which case (FIG. 3) the working tool 1 folds. After overcoming a fixed obstacle 10, the working tool 1 returns to its original working position. Folding into the transport position is performed such that into this position, the over-strain protection device 2 of the working tool 1 folds under the instructions of the operator.

INDUSTRIAL APPLICATION

A device for folding working tools can be used for agricultural machines, specifically agricultural machines whose working tools come into contact with various obstacles, and when it is also necessary to fold the working tools into transport dimensions, which are different from their working dimensions.

LIST OF REFERENCE MARKS 1 working tool
2 over-strain protection device
3 drawbar I
4 drawbar II
5 upper pivoting part I
6 lower pivoting part I
7 frame
8 upper pivoting part II
9 lower pivoting part II
10 fixed obstacle

The invention claimed is:

1. A device for folding a working tool of an agricultural machine and protecting the working tool from over-strain, the device comprising:
   an over-strain protection device;
   a frame;
   a frame upper pivot;
   a frame lower pivot;
   a working tool;
   a working tool upper pivot;
   a working tool lower pivot;
   a first drawbar; and
   a second drawbar;
   wherein the device is mounted on the frame of the agricultural machine and wherein the working tool is swivel-mounted with its back against an overloading force, which creates at least one swivel mounted protection from the over-strain protection device,
   wherein the working tool upper pivot and the working tool lower pivot are mounted on the working tool, and the frame upper pivot and the frame lower pivot are mounted on the frame, wherein the working tool upper pivot is connected to the frame lower pivot by the first drawbar, and the working tool lower pivot is connected to the frame upper pivot by the second drawbar;

wherein the over-strain protection device is simultaneously mounted in the working tool upper pivot and in the frame upper pivot;

wherein the frame, the first drawbar, the working tool, and the second draw bar form a four-joint mechanism;

wherein the second drawbar and the over-strain protection device are mounted on the common upper frame pivot, and the first drawbar and the over-strain protection device are mounted on the common working tool upper pivot.

2. The device for folding the working tool of an agricultural machine according to claim 1, wherein the over-strain protection device is adjustable in force.

3. The device for folding the working tool of an agricultural machine according to claim 1, wherein the over-strain protection device is adjustable in length.

4. The device for folding the working tool of an agricultural machine according to claim 1, wherein the over-strain protection device is a hydraulic cylinder.

5. The device for folding the working tool of an agricultural machine according to claim 1, wherein the over-strain protection device is a pneumatic cylinder.

* * * * *